United States Patent
Inakagata et al.

(10) Patent No.: US 9,590,422 B2
(45) Date of Patent: Mar. 7, 2017

(54) POWER SUPPLY SYSTEM, POWER CONVERSION APPARATUS, AND MEASUREMENT POINT SWITCHING APPARATUS

(71) Applicant: Panasonic Intellectual Property Management Co., Ltd., Osaka (JP)

(72) Inventors: Satoru Inakagata, Nara (JP); Hiroshi Nagasato, Shiga (JP); Hiroaki Kaku, Shiga (JP); Yoshikatsu Ito, Osaka (JP); Kiyoshi Ando, Osaka (JP); Yasuhisa Ihira, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 148 days.

(21) Appl. No.: 14/646,519

(22) PCT Filed: Nov. 14, 2013

(86) PCT No.: PCT/JP2013/006689
§ 371 (c)(1),
(2) Date: May 21, 2015

(87) PCT Pub. No.: WO2014/080599
PCT Pub. Date: May 30, 2014

(65) Prior Publication Data
US 2015/0318700 A1    Nov. 5, 2015

(30) Foreign Application Priority Data

Nov. 26, 2012 (JP) ................................. 2012-258040

(51) Int. Cl.
*H02J 3/12* (2006.01)
*H02J 7/35* (2006.01)
(Continued)

(52) U.S. Cl.
CPC ........ *H02J 3/12* (2013.01); *H02J 3/14* (2013.01); *H02J 3/32* (2013.01); *H02J 3/383* (2013.01);
(Continued)

(58) Field of Classification Search
None
See application file for complete search history.

(56) References Cited

U.S. PATENT DOCUMENTS

2003/0184280 A1* 10/2003 Bowman ............. G01R 22/065
                                                             324/142
2006/0028069 A1*  2/2006 Loucks ................... H02J 3/005
                                                             307/130
(Continued)

FOREIGN PATENT DOCUMENTS

JP    2002-171674 A    6/2002
JP    2009-284590 A   12/2009
(Continued)

OTHER PUBLICATIONS

International Search Report for corresponding International Application No. PCT/JP2013/006689 mailed Jan. 28, 2014.
(Continued)

*Primary Examiner* — Jared Fureman
*Assistant Examiner* — Aqeel Bukhari
(74) *Attorney, Agent, or Firm* — Renner, Otto, Boisselle & Sklar, LLP (57) ABSTRACT

An autonomous distribution board receives feeding of power via a distribution board for a period during which grid power is supplied from a grid power source, while receiving power via an autonomous terminal of a power conversion apparatus for a period during which supplying of grid power from grid power source is stopped. Autonomous distribution board is connected with a specific load and the like. A measurement point switching apparatus is configured to select one from a
(Continued)

current sensor configured to monitor a current that flows through a main breaker, and a current sensor configured to monitor a current that is supplied from power conversion apparatus to autonomous distribution board. A fuel battery is configured to adjust an output thereof based on an output of the selected one so that power by fuel battery is consumed by a general load, specific load and the like.

11 Claims, 6 Drawing Sheets

(51) Int. Cl.
*H02M 7/44* (2006.01)
*H02J 3/32* (2006.01)
*H02J 3/46* (2006.01)
*H02J 3/14* (2006.01)
*H02J 9/06* (2006.01)
*H02J 3/38* (2006.01)

(52) U.S. Cl.
CPC ............... *H02J 3/387* (2013.01); *H02J 3/46* (2013.01); *H02J 7/35* (2013.01); *H02J 9/062* (2013.01); *H02M 7/44* (2013.01); *H02J 3/382* (2013.01); *H02J 3/386* (2013.01); *H02J 2003/146* (2013.01); *Y02B 10/72* (2013.01); *Y02B 70/3225* (2013.01); *Y02B 70/3291* (2013.01); *Y02B 90/14* (2013.01); *Y02E 10/563* (2013.01); *Y02E 10/566* (2013.01); *Y02E 10/763* (2013.01); *Y02E 70/30* (2013.01); *Y02P 80/14* (2015.11); *Y04S 20/222* (2013.01); *Y04S 20/224* (2013.01); *Y04S 20/248* (2013.01); *Y10T 307/32* (2015.04)

(56) References Cited

U.S. PATENT DOCUMENTS

2010/0138066 A1* 6/2010 Kong .................. G06Q 30/018
                                                        700/295
2011/0008696 A1* 1/2011 Ballantine ......... H01M 8/04208
                                                        429/431

FOREIGN PATENT DOCUMENTS

JP        2011-083091 A      4/2011
WO        WO 2010/013783 A1  2/2010

OTHER PUBLICATIONS

Form PCT/ISA/237 for corresponding International Application No. PCT/JP2013/006689 dated Jan. 28, 2014.

* cited by examiner

POWER SUPPLY SYSTEM, POWER CONVERSION APPARATUS, AND MEASUREMENT POINT SWITCHING APPARATUS

TECHNICAL FIELD

The invention relates generally to power supply systems and, more particularly, to a power supply system that is used in combination of a cogeneration device and a power supply other than a grid power source. In addition, the invention relates to a power conversion apparatus to be used for this power supply system, and a measurement point switching apparatus to be used for this power supply system.

BACKGROUND ART

Conventionally, there has been proposed a power supply system, which is used in combination of a solar battery as a distributed power supply and a storage battery (e.g., JP 2002-171674 A (hereinafter, referred to as "Document 1")). This type of power supply system has an advantage that a power converter can be used in common by the solar battery and the storage battery. Document 1 discloses a technique of causing excess electric power generated by the solar battery to reversely flow into an electrical grid, and preventing electric power stored in the storage battery from flowing out to the electrical grid.

In recent years, there has been developed a fuel battery, which generates electric power, using hydrogen obtained by reforming fuel gas. In addition, there has been also proposed a cogeneration device, which uses, for heating water, the heat caused by the fuel battery in generating of the electric power. In many cases, it is proposed that the fuel battery as the cogeneration device is singly used, or in combination with the solar battery. On the other hand, there are only a few examples where this type of fuel battery is further combined with a distributed power supply in which the solar battery is combined with the storage battery.

In particular, in the configuration of using the fuel battery only for purpose of compensating for power shortage, it may be impossible to obtain a sufficient heat quantity for supplying hot water because of a small amount of power generated by the fuel battery. As a cogeneration device other than the fuel battery, there has been also known a configuration of using gas engine.

SUMMARY OF THE INVENTION

It is an object of the invention to provide a power supply system, which, in combination of a cogeneration device and a power supply other than a grid power source, can enhance availability of the cogeneration device, contribute to a reduction in energy costs, and secure heat quantity to be required for supplying hot water. In addition, it is an object of the invention to provide a power conversion apparatus to be used for this power supply system, and a measurement point switching apparatus to be used for this power supply system.

A power supply system according to the invention includes a distribution board, a power conversion apparatus, an autonomous distribution board, a cogeneration device and a measurement point switching apparatus. The distribution board includes a main breaker that is connected between a grid power source and a first load. The power conversion apparatus includes an interconnection terminal and an autonomous terminal. The interconnection terminal is for supplying electric power to the main breaker for a period during which grid power is supplied from the grid power source. The autonomous terminal is for extracting the electric power from the power conversion apparatus for a period during which supplying of the grid power from the grid power source is stopped. The autonomous distribution board is configured to receive feeding of power via the distribution board for the period during which the grid power is supplied from the grid power source, while receiving the electric power via the autonomous terminal of the power conversion apparatus for the period during which supplying of the grid power from the grid power source is stopped. The autonomous distribution board is connected with a second load. The cogeneration device is connected with the autonomous distribution board, and configured to perform generating of electricity and heating of water. The electricity generated by the cogeneration device is prohibited to be made reversely flow into the grid power source. The measurement point switching apparatus is configured to switch between a first current sensor and a second current sensor to set specific electric power to be output by the cogeneration device. The first current sensor is configured to monitor a current that flows through the main breaker. The second current sensor is configured to monitor a current that is supplied from the power conversion apparatus to the autonomous distribution board. The measurement point switching apparatus is configured to select the first current sensor for the period during which the grid power is supplied from the grid power source, and select the second current sensor for the period during which supplying of the grid power from the grid power source is stopped. The cogeneration device is configured to adjust an output thereof based on an output of either the first current sensor or the second current sensor selected by the measurement point switching apparatus so that the specific electric power output by the cogeneration device is consumed by the first and second loads.

In the power supply system, preferably, the cogeneration device is a fuel battery.

The power supply system preferably further includes a power supply selector. In this case, the power supply selector is preferably configured to select one from: a first state where the autonomous distribution board is connected with the distribution board; and a second state where the autonomous distribution board is connected with the autonomous terminal of the power conversion apparatus.

In the power supply system, preferably, the power conversion apparatus is capable of being connected with a solar battery and a storage battery. In this case, the power conversion apparatus is preferably configured to output, through the interconnection terminal, at least one of power generated by the solar battery and power stored in the storage battery for the period during which the grid power is supplied from the grid power source, while outputting, through the autonomous terminal, the at least one for the period during which supplying of the grid power from the grid power source is stopped. The power conversion apparatus is preferably configured to allow the power generated by the solar battery and output through the interconnection terminal to reversely flow into the grid power source.

In the power supply system, preferably, the power conversion apparatus is configured to be capable of selecting any from first to third operation modes: the first operation mode of reversely flowing excess electric power that is consumed by neither the first load nor the second load, of the power generated by the solar battery, and further performing charging of the storage battery in a time zone in which a unit price of the grid power is relatively low, while performing discharging of the storage battery in a time zone in which the unit price of the grid power is relatively high; the second operation mode of performing charging of the storage battery with the excess electric power of the power generated by the solar battery, while performing discharging of the storage battery for a time period during which the solar battery generates no power; and the third operation mode of keeping the storage battery in a fully charged state.

A power conversion apparatus according to the invention is used for any one of the above-mentioned power supply systems.

A measurement point switching apparatus according to the invention is used for any one of the above-mentioned power supply systems.

According to the configuration of the invention, because the output of the cogeneration device is controlled based on the current flowing through the main breaker, received from the grid power source, the cogeneration device supplies the electricity also to a load that receives feeding of power via the main breaker. Therefore, in combination of the cogeneration device and a power supply other than the grid power source, it is possible to enhance availability of the cogeneration device. In addition, the enhancing of the availability of the cogeneration device causes a reduction in the amount of grid power to be purchased from the grid power source, and therefore, it is possible to contribute to a reduction in energy costs, and further secure heat quantity to be required for supplying hot water.

EMBODIMENT FOR CARRYING OUT THE INVENTION

Figure 1:
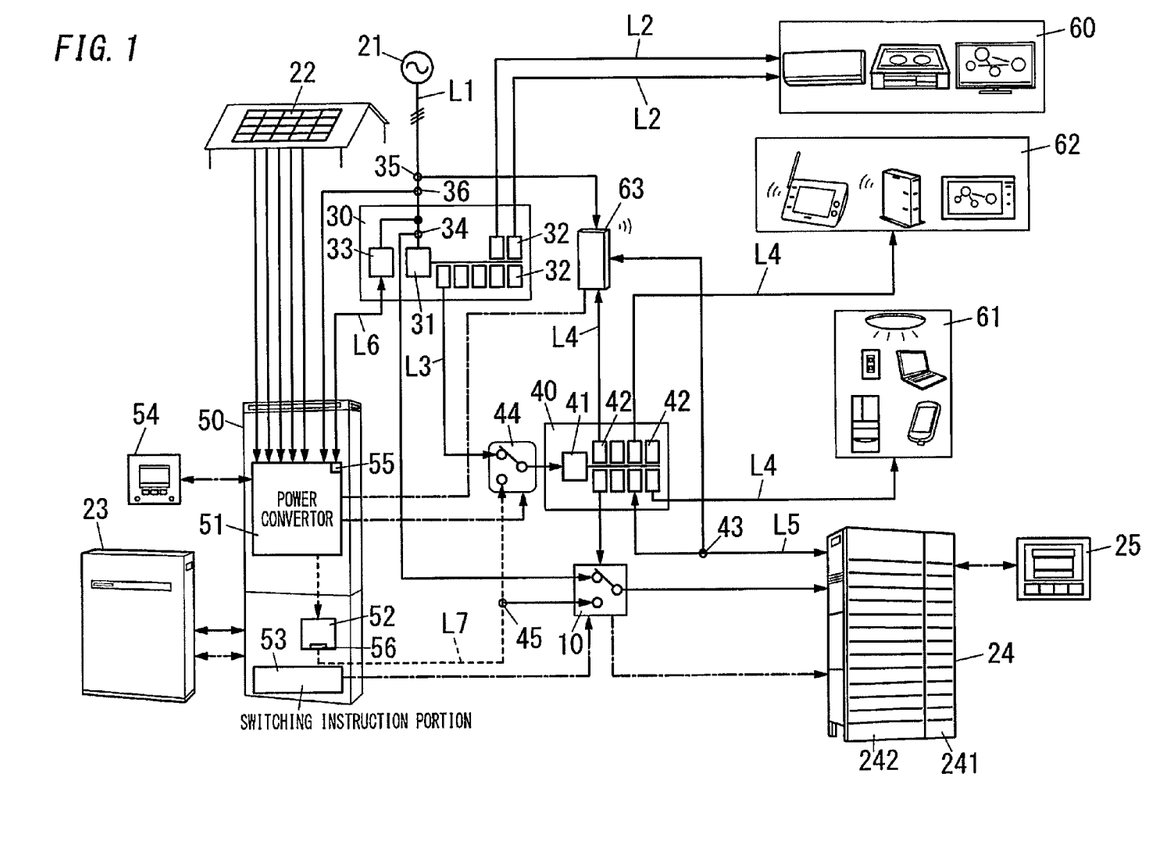
FIG. 1 is a block diagram illustrating an embodiment during a non-power failure.

As shown in FIG. 1, a power supply system described below includes a distribution board 30, a power conversion apparatus 50, an autonomous distribution board 40, a cogeneration device (fuel battery 24) and a measurement point switching apparatus 10. The distribution board 30 includes a main breaker 31 that is connected between a grid power source 21 and a first load (loads 60). The power conversion apparatus 50 includes an interconnection terminal 55 and an autonomous terminal 56. The interconnection terminal 55 is for supplying electric power to the main breaker 31 for a period during which grid power is supplied from the grid power source 21. The autonomous terminal 56 is for extracting the electric power from the power conversion apparatus for a period during which supplying of the grid power from the grid power source 21 is stopped. The autonomous distribution board 40 is configured to receive feeding of power via the distribution board 30 for the period during which the grid power is supplied from the grid power source 21, while receiving the electric power via the autonomous terminal 56 of the power conversion apparatus 50 for the period during which supplying of the grid power from the grid power source 21 is stopped. The autonomous distribution board 40 is connected with a second load (loads 61 and the like). The cogeneration device is connected with the autonomous distribution board 40, and configured to perform generating of electricity and heating of water. The electricity generated by the cogeneration device is prohibited to be made reversely flow into the grid power source 21. The measurement point switching apparatus 10 is configured to switch between a first current sensor (current sensor 34) and a second current sensor (current sensor 45) to set specific electric power to be output by the cogeneration device. The first current sensor is configured to monitor a current that flows through the main breaker 31. The second current sensor is configured to monitor a current that is supplied from the power conversion apparatus 50 to the autonomous distribution board 40. The measurement point switching apparatus 10 is configured to select the first current sensor for the period during which the grid power is supplied from the grid power source 21, and select the second current sensor for the period during which supplying of the grid power from the grid power source 21 is stopped. The cogeneration device is configured to adjust an output thereof based on an output of either the first current sensor or the second current sensor selected by the measurement point switching apparatus 10 so that the specific electric power output by the cogeneration device is consumed by the first load (loads 60) and the second load (loads 61 and the like).

The power supply system preferably further includes a power supply selector 44 configured to select one from: a first state where the autonomous distribution board 40 is connected with the distribution board 30; and a second state where the autonomous distribution board 40 is connected with the autonomous terminal 56 of the power conversion apparatus 50.

The power conversion apparatus 50 is preferably capable of being connected with a solar battery 22 and a storage battery 23. In this case, the power conversion apparatus 50 is configured to output, through the interconnection terminal 55, at least one of power generated by the solar battery 22 and power stored in the storage battery 23 for the period during which the grid power is supplied from the grid power source 21. The power conversion apparatus 50 is further configured to output, through the autonomous terminal 56, the at least one for the period during which supplying of the grid power from the grid power source 21 is stopped. The power conversion apparatus 50 is configured to allow the power generated by the solar battery 22 and output through the interconnection terminal 55 to reversely flow into the grid power source 21.

The power conversion apparatus 50 is preferably configured to reversely flow excess electric power that is consumed by neither the first load (loads 60) nor the second load (loads 61 and the like), of the power generated by the solar battery 22. This power conversion apparatus 50 is configured to be capable of selecting any from a first operation mode, a second operation mode and a third operation mode. In the first operation mode, charging of the storage battery 23 is performed in a time zone in which a unit price of the grid power is relatively low, while discharging of the storage battery 23 is performed in a time zone in which the unit price of the grid power is relatively high. In the second operation mode, charging of the storage battery 23 is performed with the excess electric power of the power generated by the solar battery 22, while discharging of the storage battery 23 is performed for a time period during which the solar battery 22 generates no power. In the third operation mode, the storage battery 23 is kept in a fully charged state.

Figure 2:
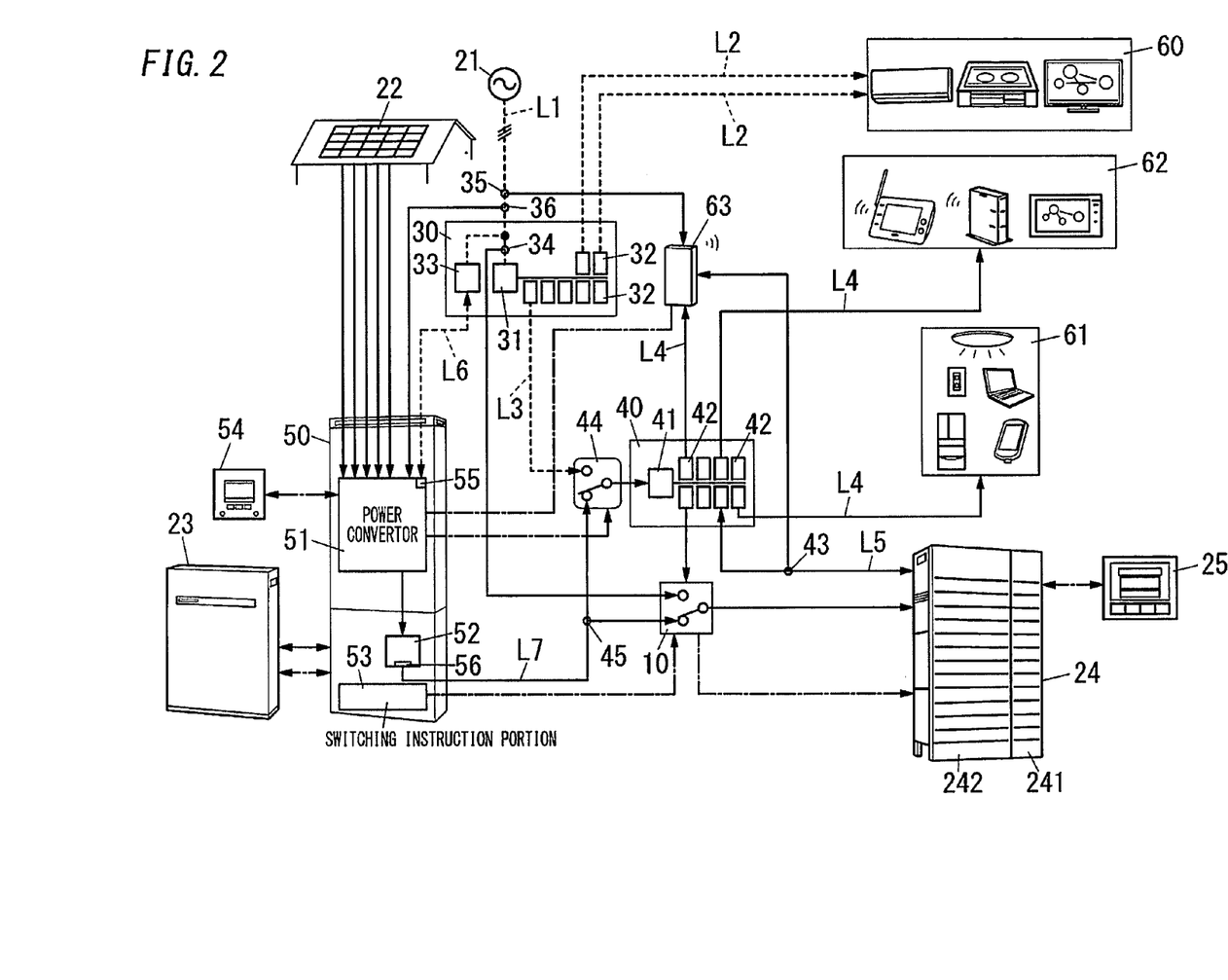
FIG. 2 is a block diagram illustrating the embodiment during a power failure.

Hereinafter, the configuration of the embodiment will be described more in detail. FIGS. 1 and 2 show the whole configuration of the power supply system described in the embodiment. The power supply system shown in those figures includes, as power supplies of supplying electric power to loads, four kinds of power supplies: the grid power source 21; the solar battery 22; the storage battery 23; and the fuel battery 24. The "grid power source" 21 means a power supply to be supplied through a power grid from a power provider, such as an electric power company.

The fuel battery 24 is configured using hydrogen gas generated by reforming fuel gas including methane or propane, and has a configuration in which a power generation unit 241 and a hot water storage unit 242 are arranged side by side. The hot water storage unit 242 is configured to increase temperature of hot water stored in a hot water tank, using exhaust heat from the power generation unit 241, and functions as a cogeneration device.

In other words, the fuel battery 24 has both functions of generating of electricity and heating of water. The fuel battery 24 further includes an auxiliary heat source for additionally providing heat, when heat quantity stored as the hot water in the hot water tank is insufficient. The fuel battery 24 further may include an auxiliary heat source that is used for additionally heating hot water stored in a bathtub. The fuel battery 24 is capable of communicating with a remote controller 25 that is used for managing an operation state. In an example of FIG. 3, the fuel battery 24 is capable of communicating with two remote controllers 25 (see FIG. 1): a remote controller 251 for bathroom and a remote controller 252 for kitchen.

In the embodiment, the solar battery 22 is illustrated as a power supply in which its electric power is allowed to be made reversely flow into a power grid 20. The solar battery 22 can be also replaced with a power supply that generates electric power, using natural energy, such as wind power, water power or geothermal heat. In the embodiment, the storage battery 23 and the fuel battery 24 each is illustrated as a power supply in which its electric power is prohibited to be made reversely flow into the power grid 20. The fuel battery 24 may be replaced with a cogeneration device that generates electric power, using gas engine (gas micro turbine).

Regarding three kinds of power supplies: the solar battery 22; the storage battery 23; and the fuel battery 24 shown in the figures, a consumer may optionally determine whether or not those installations are needed. That is, those power supplies may be introduced at proper time as needed. In the case of using the solar battery 22 or the storage battery 23 as the power supply, the power conversion apparatus 50 is required in order to perform power conversion between AC and DC. In the case of introducing the fuel battery 24, additional installation of the autonomous distribution board 40 and the like is required.

A distribution line L1 connected with the grid power source 21 is connected with the distribution board 30. The distribution board 30 stores in a housing thereof (not shown): the main breaker 31 connected with the distribution line L1; and branch breakers 32 for branching electric power on the load side of the main breaker 31. Some of the branch breakers 32 are provided for supplying electric power to the loads (first load) 60 via branch lines L2, respectively. In the figures, the loads 60 are assigned with a single reference numeral in a lump, however, the reference numeral "60" means each load.

The distribution board 30 further stores in the housing thereof an interconnection breaker 33 and the first current sensor (current sensor 34). The interconnection breaker 33 is inserted between the power conversion apparatus 50 described later and the distribution line L1. The main breaker 31 and the interconnection breaker 33 are connected with the distribution line L1 in common.

The current sensor 34 is disposed so as to detect a current that flows through the main breaker 31. In the illustrated example, the current sensor 34 is disposed in the distribution line L1 to measure a current that flows through an electric line between the main breaker 31 and a connecting point of the interconnection breaker 33 and the distribution line L1. The current sensor 34 is disposed so as to individually detect currents flowing in two voltage wires (a U-phase and a W-phase) of a single-phase three-wire.

Although assuming that the current sensor 34 is a current transformer with a core, as a specific configuration, it may be configured by a coreless coil (so-called Rogowski coil) or a magnetic sensor. Similarly, the same thing can be said of current sensors 35, 36, 43, 45, 45A and 45B described later, and specific configurations of the current sensors 35, 36, 43, 45, 45A and 45B correspond to the specific configuration of the current sensor 34.

One of the branch breakers 32 stored in the distribution board 30 is connected with the autonomous distribution board 40 via a branch line L3 that is a single-phase three-wire type. The power supply selector 44 is inserted in the branch line L3, and configured to select any from electric power to be supplied from the branch breaker 32 and electric power to be supplied from the power conversion apparatus 50, and supply it to the autonomous distribution board 40. The power supply selector 44 includes an electromagnetic relay.

The autonomous distribution board 40 forms paths to supply electric power to: the loads (second load) 61 that need to receive electric power even in a state where no grid power is supplied from the grid power source 21; a management apparatus 62 that is configured to manage operations of the loads 60 and 61; and a measurement apparatus 63. In the figures, the loads 61 are assigned with a single reference numeral in a lump, however, the reference numeral "61" means each load. The reference numeral "62" represents a group of devices constituting the management apparatus 62. Hereinafter, in order to distinguish the loads 60 from the loads 61, the loads 60 are referred to as "general loads", and the loads 61 are referred to as "specific loads".

Similarly to the distribution board 30, the autonomous distribution board 40 stores in a housing (not shown) thereof a main breaker 41 and branch breakers 42. Some of the branch breakers 42 are provided for supplying electric power to the specific loads 61, the management apparatus 62, the measurement apparatus 63 and the measurement point switching apparatus 10 described later via branch lines L4, respectively. One of the branch breakers 42 is connected with the fuel battery 24 via a connection line L5. Electric power generated by the fuel battery 24 can be supplied to the specific loads 61, the management apparatus 62, the measurement apparatus 63 and the measurement point switching apparatus 10. The electric power generated by the fuel battery 24 can be also supplied to the distribution board 30 via the main breaker 41, and accordingly, also to the general loads 60. The management apparatus 62, the measurement apparatus 63 and the measurement point switching apparatus 10 operate with electric power received from the autonomous distribution board 40 for a period during which supplying of the grid power from the grid power source 21 is stopped. For this reason, those apparatuses 62, 63 and 10 each corresponds to a second load, similarly to the specific loads 61. In other words, those apparatuses 62, 63 and 10 operate with electric power received via the main breaker 31 for a period during which the grid power is supplied from the grid power source 21.

The measurement apparatus 63 is configured to acquire outputs of the current sensors 35 and 43 to calculate electric power that passes through electric lines (the distribution line L1 and the connection line L5) in which the respective current sensors 35 and 43 are disposed, and then report, to the power conversion apparatus 50, information relating to the calculated electric power. The measurement apparatus 63 is further configured to monitor whether or not the grid power is being supplied from the grid power source 21, based on the output of the current sensor 35. The current sensor 35 is disposed to measure a current that flows through the distribution line L1, and monitors a supply state of the grid power from the grid power source 21. The current sensor 43 is disposed to measure a current that flows through the connection line L5, and monitors a supply state of the electric power from the fuel battery 24.

In FIGS. 1 and 2, alternate long and short dash lines represent communication lines, and, for example, serial communication in compliance with the RS485 standard is performed. The communication lines are not needed to have specification in compliance with the RS485 standard, but the communication may be performed by using wireless communication lines, or a technique of power line carrier communication using wire communication lines. Those techniques may be used in combination.

The distribution board 30 stores in the housing thereof the interconnection breaker 33 connected with an electric line (the distribution line L1) on a primary side of the main breaker 31. The main breaker 31 and the interconnection breaker 33 are connected with the distribution line L1 in common. The interconnection breaker 33 forms a path for supplying electric power generated by the solar battery 22 to the electric line on the primary side of the main breaker 31, and further forms a path for charging the storage battery 23 with the grid power received from the grid power source 21. The interconnection breaker 33 is a so-called remote control breaker, and is configured to switch on/off according to an instruction from the power conversion apparatus 50.

The power conversion apparatus 50 is connected with the solar battery 22 and the storage battery 23, and has both of functions: of transmitting/receiving electric power to/from the distribution board 30; and supplying electric power to the autonomous distribution board 40. For this reason, the power conversion apparatus 50 includes a power convertor 51 that is configured to convert DC power generated by the solar battery 22 or DC power stored in the storage battery 23 into AC power that is equivalent to the grid power source 21. The power conversion apparatus 50 further includes a transformer 52 that is configured to convert electric power output from the power convertor 51 with two-wires into electric power be output with three-wires.

The power convertor 51 also has a function of managing a charging current of the storage battery 23, and a function of managing electric power when making excess electric power that is not consumed by a consumer, of electric power generated by the solar battery 22, reversely flow into the distribution line L1. The charging current of the storage battery 23 is monitored inside of the power conversion apparatus 50. The electric power made to reversely flow into the distribution line L1 is monitored by acquiring an output of the current sensor 36 measuring a current that flows through the distribution line L1.

The power convertor 51 includes: a first conversion circuit that is configured to convert the DC power generated by the solar battery 22 into the AC power that is equivalent to the grid power source 21; and a second conversion circuit that is configured to perform charging or discharging of the storage battery 23. The power convertor 51 further includes: a first connecting portion that is connected with the interconnection breaker 33; and a second connecting portion that is for supplying electric power to the transformer 52.

The first connecting portion is connected with the distribution line L1 via the interconnection breaker 33, and accordingly, the grid interconnection can be performed. Specifically, the first connecting portion is a single-phase three-wire type, and connected with the interconnection breaker 33 via a connection line L6, and further connected with the distribution line L1 on the primary side of the main breaker 31 via the interconnection breaker 33. Hereinafter, the first connecting portion of the power convertor 51 is referred to as the interconnection terminal 55.

The connection line L6 is used as a path for supplying, to the main breaker 31 of the distribution board 30, AC power obtained based on the electric power generated by the solar battery 22 or the electric power stored in the storage battery 23, or as a path for making the electric power generated by the solar battery 22 reversely flow into the distribution line L1. The connection line L6 is further used also as a path for charging the storage battery 23 with the electric power supplied from the grid power source 21 via the distribution line L1. A voltage between terminals of the interconnection terminal 55 depends on a voltage between wires of the power grid 20.

On the other hand, the second connecting portion of the power convertor 51 is configured to output no power to the transformer 52 for a period during which the grid power can be received from the grid power source 21, and output power to the transformer 52 for a period during which the grid power cannot be received from the grid power source 21. The power convertor 51 is configured to determine, based on the voltage between the terminals of the interconnection terminal 55, whether or not the grid power can be received from the grid power source 21. The second connecting portion is a single-phase two-wire type, and connected with a primary side of the transformer 52, using two wires, to only output electric power to the transformer 52. A voltage between terminals of the second connecting portion is kept at a constant value (e.g., 200 V). Hereinafter, in the power conversion apparatus 50, a terminal provided on a secondary side of the transformer 52 is referred to as the autonomous terminal 56. Accordingly, electric power output from the autonomous terminal 56 is derived from at least one of the solar battery 22 and the storage battery 23. The autonomous terminal 56 is connected with the power supply selector 44 via a connection line L7 that is a single-phase three-wire type.

The power conversion apparatus 50 is configured to communicate with a remote controller 54, so that a user can indicate the operation and monitor the apparatus. The remote controller 54 has not only a function of visualizing an operation state of the power conversion apparatus 50, but also a function of selecting an operation mode of the power conversion apparatus 50. The operation mode of the power conversion apparatus 50 will be described later. The power conversion apparatus 50 is configured to determine whether to output, from the interconnection terminal 55 or the autonomous terminal 56, electric power generated by the solar battery 22 and electric power stored in the storage battery 23, based on a state whether or not the grid power can be received from the grid power source 21, and the operation mode of the power conversion apparatus 50.

In the consumer's building, the current sensor 35 is disposed in the distribution line L1 on the primary side of the main breaker 31 in order to measure the grid power received from the grid power source 21. Further, the above-mentioned current sensor 36 is disposed between the current sensor 35 and the main breaker 31 in the distribution line L1 in order to detect the electric power made to reversely flow into the grid power source 21. The current sensor 36 monitors a current at a position closer to the grid power source 21 than a connecting point of the main breaker 31 and the interconnection breaker 33 in the distribution line L1.

The current sensor 35 is connected with the measurement apparatus 63. The measurement apparatus 63 is configured to measure the grid power received from the grid power source 21, based on a current value measured by the current sensor 35. The measurement apparatus 63 is configured to acquire information relating to the power generation amount of the solar battery 22 by communication with the power convertor 51, and further acquire information relating to charging and discharging of the storage battery 23. On the other hand, an output of the current sensor 36 is input to the power conversion apparatus 50. The power conversion apparatus 50 is configured to determine, based on the output of the current sensor 36, whether or not reversely flowing of the power into the grid power source 21 from the consumer's building occurs. The current sensor 36 is disposed so as to individually detect currents flowing through two voltage wires of the single-phase three-wire.

Whether or not reversely flowing of the power into the grid power source 21 from the consumer's building occurs is determined based on a relation between: a phase of a current monitored by the current sensor 36; and a phase of a voltage between the terminals of the interconnection terminal 55. The voltage between the terminals of the interconnection terminal 55 and the phrase thereof are identical to a voltage between the wires of the distribution line L1 electrically connected with the interconnection terminal 55 and the phrase thereof, respectively. For this reason, in the power conversion apparatus 50, whether or not reversely flowing of the power occurs is determined, using a waveform of the voltage between the terminals of the interconnection terminal 55 and a waveform of the current monitored by the current sensor 36, based on a sign of an integral value obtained by integrating electric power with respect to a cycle of the waveform of the voltage.

As described above, the power supply selector 44 selects one from the branch line L3 and the connection line L7, and connect the one to the main breaker 41 of the autonomous distribution board 40. The power supply selector 44 selects one from a state where the branch line L3 is connected with the autonomous distribution board 40 and a state where the connection line L7 is connected with the autonomous distribution board 40, according to an instruction from the power convertor 51. In other words, the autonomous distribution board 40 receives electric power via the distribution board 30 for a period during which the grid power is supplied from the grid power source 21, and receives electric power from the power conversion apparatus 50 not via the distribution board 30 for a period during which supplying of the grid power from the grid power source 21 is stopped.

The power conversion apparatus 50 includes a switching instruction portion 53 that is configured to give the measurement point switching apparatus 10 an instruction, using a switching signal. The switching instruction portion 53 transmits, to the measurement point switching apparatus 10, the switching signal that indicates the period during which the grid power is supplied from the grid power source 21 or the period during which supplying of the grid power from the grid power source 21 is stopped. The switching signal is transmitted also to the fuel battery 24 through the measurement point switching apparatus 10.

The measurement point switching apparatus 10 selects one of the current sensor 34 stored in the distribution board 30 and the second current sensor (current sensor 45) of measuring a current flowing through the connection line L7 to acquire a current value monitored by the fuel battery 24 from the selected one. In other words, the measurement point switching apparatus 10 connects the current sensor 34 to the fuel battery 24 for the period during which the grid power is supplied from the grid power source 21, and connects the current sensor 45 to the fuel battery 24 for the period during which supplying of the grid power from the grid power source 21 is stopped.

Since electric power generated by the fuel battery 24 is prohibited to be made reversely flow into the grid power source 21, whether or not reversely flowing of the power occurs is determined based on currents monitored by the current sensors 34 and 45. In other words, the outputs of the current sensors 34 and 45 are used in order to monitor whether or not electric power that is not consumed in the consumer's building is generated for a time period during which the fuel battery 24 generates electric power. The electric power generated by the fuel battery 24 is monitored by the current sensor 43. The current sensor 43 monitors a current that flows through the connection line L5 connecting the fuel battery 24 with the branch breaker 32. The output of the current sensor 43 is input to the measurement apparatus 63. The measurement apparatus 63 manages electric power that passes through the connection line L5.

On the other hand, the outputs of the current sensors 34 and 45 are input to the fuel battery 24. The fuel battery 24 is configured to determine, based on the outputs of the current sensors 34 and 45, whether or not electric power output from the fuel battery 24 is being consumed in the consumer's building. Whether or not electric power that is not being consumed in the consumer's building is included in the electric power from the fuel battery 24 is determined based on a relation between phases of a voltage and a current, similarly to the output of the current sensor 36.

The fuel battery 24 is configured to communicate with the power conversion apparatus 50 via the measurement point switching apparatus 10. In other words, a signal indicating whether or not the grid power can be received from the grid power source 21 is transmitted from the power conversion apparatus 50 to not only the measurement point switching apparatus 10, but also the fuel battery 24. Whether electric power is output from the interconnection terminal 55 or the autonomous terminal 56 of the power conversion apparatus 50 is reported also to the fuel battery 24. In the figures, paths of the above signals are respectively shown by an alternate long and short dash line connecting the power conversion apparatus 50 and the measurement point switching apparatus 10, and an alternate long and short dash line connecting the measurement point switching apparatus 10 and the fuel battery 24.

Note that, FIG. 1 shows a state where the grid power is supplied from the grid power source 21, and in this case, no electric power is supplied through the connection line L7 shown by a broken line. On the other hand, FIG. 2 shows a state where supplying of the grid power from the grid power source 21 is stopped, and in this case, no electric power is supplied through the distribution line L1, the branch lines L2 and L3, and the connection line L6, shown by broken lines.

Figure 3:
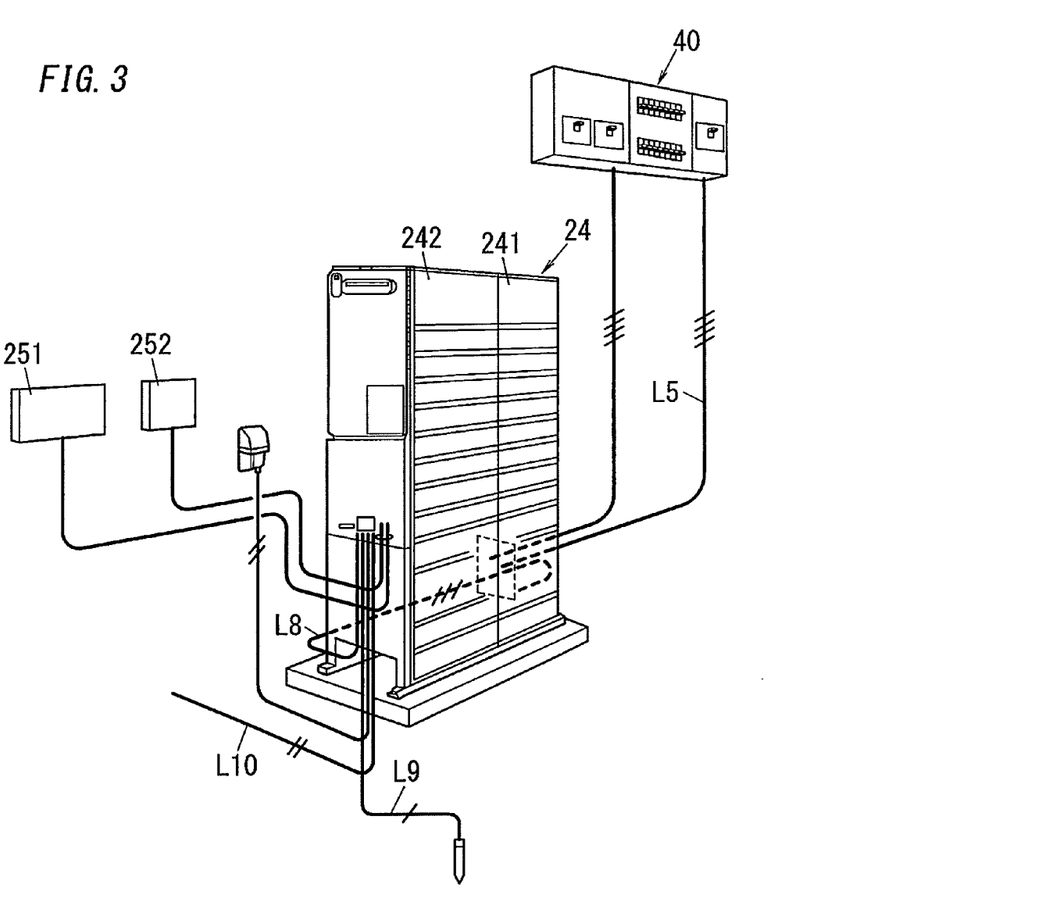
FIG. 3 is a perspective view of appearance of a fuel battery to be used for the embodiment.

As described above, the fuel battery 24 is connected with the autonomous distribution board 40 via the connection line L5. Since the connection line L5 is a single-phase three-wire type, it is preferred that the branch breaker 42 to be connected with the connection line L5 be provided separately from the other branch breakers 42 each having the configuration corresponding to a single-phase two-wire type in the autonomous distribution board 40, as shown in FIG. 3. The fuel battery 24 is capable of being connected with a communication line L8 for communicating with the measurement point switching apparatus 10, a ground line L9 for grounding, a communication line L10 for managing the operation at a distant place, and the like.

Hereinafter, an operation of the embodiment will be described. In the power conversion apparatus 50, an operation mode is selected using the remote controller 54. The power conversion apparatus 50 is configured to be capable of selecting any from at least three operation modes: an economy priority mode (first operation mode), an environment priority mode (second operation mode); and a power storage priority mode (third operation mode).

The economy priority mode is an operation mode intended to decrease the price for the grid power to be purchased from the grid power source 21, and increase the profit to be obtained by making electric power reversely flow into the distribution line L1. The environment priority mode is an operation mode intended to decrease the amount of the grid power to be purchased from the grid power source 21. The power storage priority mode is an operation mode intended to always keep the storage battery 23 in almost a fully charged state in preparation for the case where supplying of the grid power from the grid power source 21 is stopped.

Figure 4:
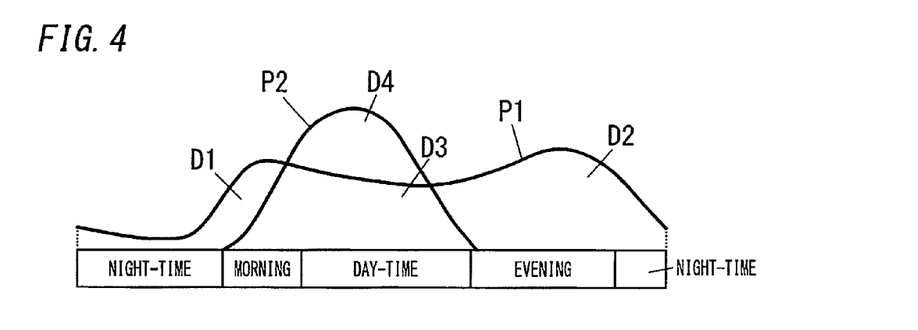
FIG. 4 is an operation explanatory drawing for the embodiment, showing a relation between power consumption and power generation.

Now, it is assumed that electric power consumed by the general loads 60, the specific loads 61, the management apparatus 62 and the like is increased/decreased as a characteristic P1 in FIG. 4, and electric power generated by the solar battery 22 is increased/decreased as a characteristic P2 in FIG. 4. Hereinafter, the electric power consumed by the general loads 60, the specific loads 61, the management apparatus 62 and the like is referred to as "power consumption" in a lump. In the state shown in FIG. 1, the power consumption is calculated based on a current value measured by the current sensor 34 provided in the distribution board 30. In the state shown in FIG. 2, the power consumption is calculated based on a current value measured by the current sensor 45 provided in the connection line L7.

In the bottom of FIG. 4, terms of "night-time", "morning", "day-time" and "evening" are described for representing a standard of time zones. The "night-time", "morning", "day-time" and "evening" represent time zones corresponding unit prices of the grid power in the case of purchasing the grid power from the grid power source 21. The "night-time" corresponds to a time zone in which the unit price of the grid power is the lowest. The "day-time" and "evening" each corresponds to a time zone in which the unit price of the grid power is high. The "morning" and "day-time" each corresponds to a time zone in which the power generation amount of the solar battery 22 is relatively-large. The "evening" corresponds to a time zone in which the power generation of the solar battery 22 is almost stopped. The "night-time" corresponds to a time zone in which no power is obtained from the solar battery 22.

When combining the characteristics P1 and P2, as shown in FIG. 4, a region is divided into four regions D1 to D4. In the regions D1 and D2, since the solar battery 22 is stopped, electric power is required to be supplied from a power supply other than the solar battery 22. In the regions D3 and D4, the solar battery 22 generates electric power. The region D4 represents that the excess (hereinafter, referred to as "excess electric power") occurs even if subtracting the power consumption from the electric power generated by the solar battery 22.

In the economy priority mode, when the excess electric power as the region D4 occurs, the reversely flowing thereof into the distribution line L1 is made so that the power selling income can be earned. The charging of the storage battery 23 is performed not with the electric power generated by the solar battery 22, but with the grid power received from the grid power source 21 in the time zone of the "night-time" in which the unit price of the grid power is low. The discharging of the storage battery 23 is performed in the time zones of the "day-time" and "evening" if necessary.

On the other hand, in the environment priority mode, the excess electric power as the region D4 is used for the charging of the storage battery 23, and the discharging of the storage battery 23 is performed to be applied to the power consumption in the time zones of the "evening" and "night-time" in which no electric power is obtained from the solar battery 22. In this case, if the amount of electric power stored in the storage battery 23 is insufficient for being applied to the power consumption, the insufficiency is required to be received from the grid power source 21, however still, it is possible to reduce the amount of the grid power to be received from the grid power source 21. Therefore, most of the electric power to be applied to the power consumption can be used from renewable energy, and it follows the purpose of reducing the environmental load.

In the power storage priority mode, the charging of the storage battery 23 is performed until it becomes almost a fully charged state, regardless of the electric power generated by the solar battery 22, and when the charging is completed, charging, as trickle charging, for only keeping it in the fully charged state is performed, and it is in a stand-by state without discharging. In this case, when supplying of the grid power from the grid power source 21 is stopped, the power supplying is started, using the electric power stored in the storage battery 23.

As it is obvious from the above-mentioned explanation relating to the operation modes, the discharging of the storage battery 23 is allowed to be performed always in the environment priority mode, if necessary, and only in the time zones of the "day-time" and "evening" in the economy priority mode. In the embodiment, the system is configured to perform the interconnection with the fuel battery 24 for those periods during which the discharging of the storage battery 23 is allowed to be performed.

Here, electric power that can be generated by the fuel battery 24 has an upper limit value, and the combination of the solar battery 22 and the fuel battery 24 is set so that this upper limit value is equal to almost a fraction of maximum electric power of the solar battery 22. For example, adopted is the combination in which the maximum electric power of the solar battery 22 is 3 kW and the upper limit value of the fuel battery 24 is 750 W.

For the above-mentioned period during which the discharging of the storage battery 23 is allowed to be performed, when the power consumption calculated based on a current value measured by the current sensor 34 or 45 is equal to or less than the upper limit value of the electric power that can be generated by the fuel battery 24, the power generation of the fuel battery 24 is applied to the power consumption. On the other hand, for this period, when the power consumption calculated based on the measured current value exceeds the upper limit value of the electric power that can be generated by the fuel battery 24, the electric power stored in the storage battery 23 is applied for the insufficiency.

Note that, the system is configured so that charging of the storage battery 23 is not performed with the electric power generated by the fuel battery 24, in the time zone of the "night-time" in which the charging of the storage battery 23 is performed in the economy priority mode, in the time zone in which the charging of the storage battery 23 is performed with the excess electric power in the environment priority mode, and in the state where the power storage priority mode is selected. In other words, since the current sensor 34 (provided on the upstream side of the main breaker 31 in the distribution board 30) is connected with the fuel battery 24, it is possible to manage the electric power by the fuel battery 24 so as not to be made to reversely flow.

Here, there are time lags with respect to changes of output powers of the fuel battery 24 and the power conversion apparatus 50, and accordingly, if the power consumption changes suddenly, it is difficult to immediately follow the change of the power consumption. While the power conversion apparatus 50 is operated in the environment priority mode, the amount of grid power received from the grid power source 21 is needed to smoothly converge with respect to the change of the power consumption, regardless of the power generating state or the stopped state of the fuel battery 24. In addition, for a time period during which the fuel battery 24 generates electric power, the amount of grid power received from the grid power source 21 is needed to smoothly converge with respect to the change of the power consumption, regardless of the operated state or the stopped state of the power conversion apparatus 50.

Figure 5:
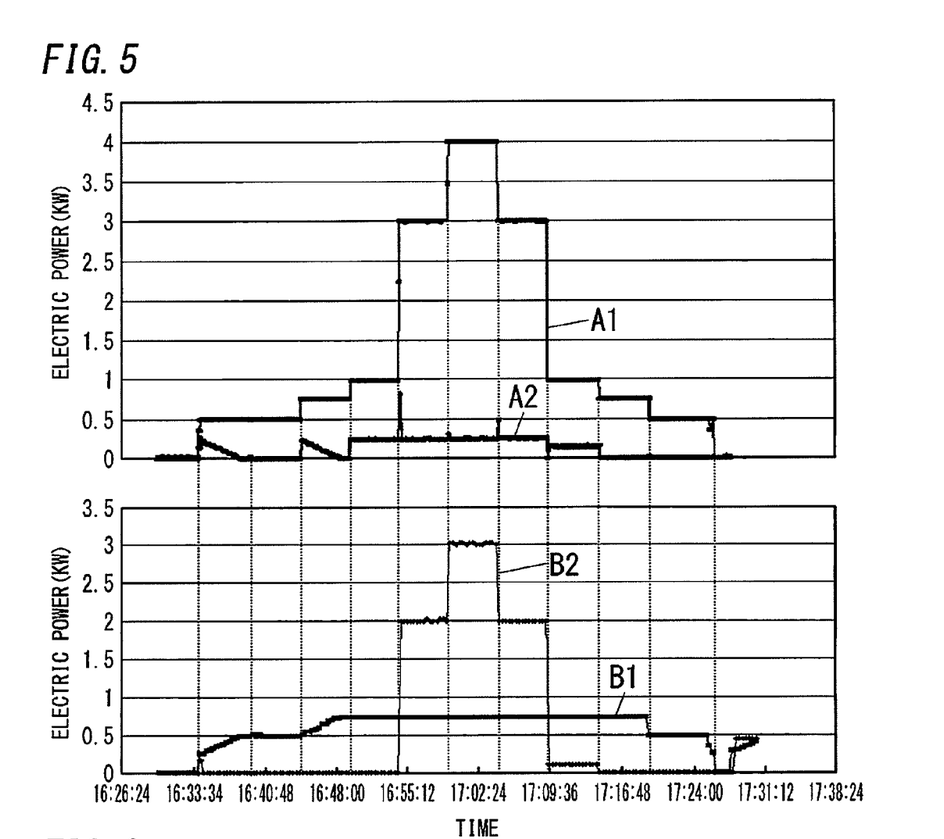
FIG. 5 is an operation explanatory drawing for the embodiment.

In the illustrated example of FIG. 5, the top thereof shows the power consumption (a characteristic A1) and the grid power received from the grid power source 21 (a characteristic A2), and the bottom thereof shows the electric power output from the fuel battery 24 (a characteristic B1) and the electric power output from the power conversion apparatus 50 (a characteristic B2).

As can be expected from the figure, the output power of the fuel battery 24 denoted by the characteristic B1 has a time lag with respect to the change of the power consumption denoted by the characteristic A1. In the illustrated example, due to the response time lag, the output power of the fuel battery 24 changes at an inclination of about 2 W/s. Here, since the electric power output from the fuel battery 24 is insufficient for being applied to the power consumption, the grid power is received from the grid power source 21 so as to offset this inclination, as denoted by the characteristic A2.

When the power consumption exceeds the upper limit value (750 W in the illustrated example) of the electric power that can be generated by the fuel battery 24, the power conversion apparatus 50 starts an operation so as to apply the electric power stored in the storage battery 23 to the power consumption, as denoted by the characteristic B2. However, since there is a slight time lag in the rise of the electric power output from the power conversion apparatus 50, the power shortage during this time lag is offset by receiving the grid power from the grid power source 21 for only a short time, as shown by the characteristic A2 near a time of 16:55:12.

Figure 6:
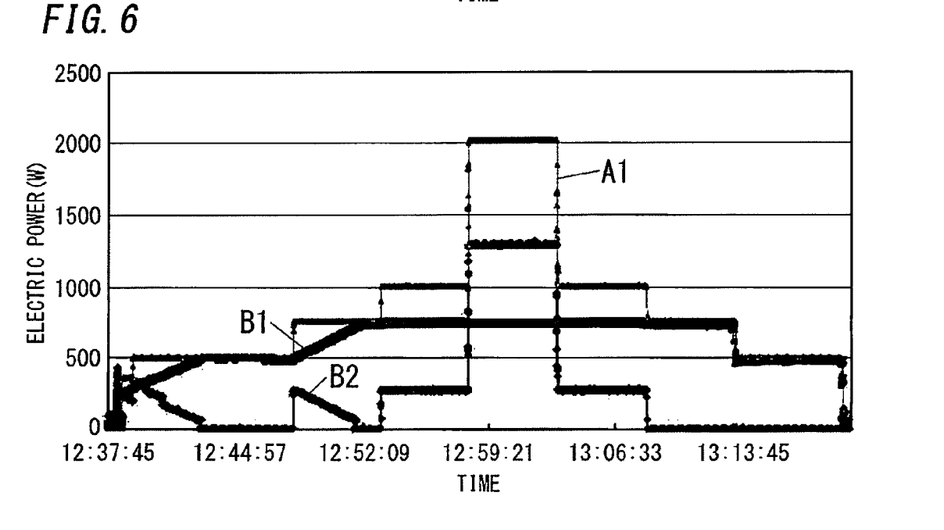
FIG. 6 is another operation explanatory drawing for the embodiment.

An operation example in FIG. 6 is an operation in a case of not receiving the grid power from the grid power source 21, and characteristics A1, B1 and B2 represents the power consumption, the output power of the fuel battery 24 and the output power of the power conversion apparatus 50, respectively. In the example of FIG. 6, the electric power output from the power conversion apparatus 50 is applied for the insufficiency with respect to the power consumption, for a period during which the output power of the fuel battery 24 does not follow the change of the power consumption.

Hereinafter, an operation in a state where the grid power is not supplied from the grid power source 21 (i.e., in a case of a power failure) will be described. The power conversion apparatus 50 turns off the interconnection breaker 33 to be disconnected from the grid, when detecting the power failure based on an output of the measurement apparatus 63 or the current sensor 36. In the power conversion apparatus 50, whether an autonomous operation is started automatically or manually after the disconnection is selected, according to the operation to the remote controller 54. When the autonomous operation is started, an electromagnetic relay of the power supply selector 44 is switched, and accordingly, the system is shifted to a state where electric power is supplied from the transformer 52 of the power conversion apparatus 50 to the autonomous distribution board 40. In a case where there is a time lag (e.g., at most 5 sec) in this switching, the power supplying to the specific loads 61, the management apparatus 62 and the like is temporarily stopped for a period of the time lag.

Since electric power is required for activating the fuel battery 24, the fuel battery 24 is activated with electric power supplied from the power conversion apparatus 50 via the autonomous distribution board 40. Note that, if the fuel battery 24 is in the operated state, the operation of the fuel battery 24 is continued even when the power failure occurs.

As described above, since the electric power that is output from the fuel battery 24 is limited at the upper limit value, it is insufficient for being applied to electric power to be consumed by the loads 60 that receives electric power from the distribution board 30. For this reason, during the power failure, targets to which electric power is supplied are set to the specific loads 61, the management apparatus 62 and the like, which are connected with the autonomous distribution board 40. The power conversion apparatus 50 instructs the measurement point switching apparatus 10 to switch a measurement point for monitoring reversely flowing of the electric power by the fuel battery 24. That is, the measurement point switching apparatus 10 connects the current sensor 34 to the fuel battery 24 during the non-power failure, and the current sensor 45 to the fuel battery 24 during the power failure.

Note that, during a period of the autonomous operation, when the power consumption exceeds the sum of the maximum electric power allowed by the power conversion apparatus 50 and the upper limit value of the output power by the fuel battery 24, the line voltages of the branch line L4 and the connection lines L5 and L7 are reduced. When detecting this reduction of the line voltages, the power conversion apparatus 50 and the fuel battery 24 stop outputs thereof, and make the remote controllers 25 and 54 display an error.

Figure 7:
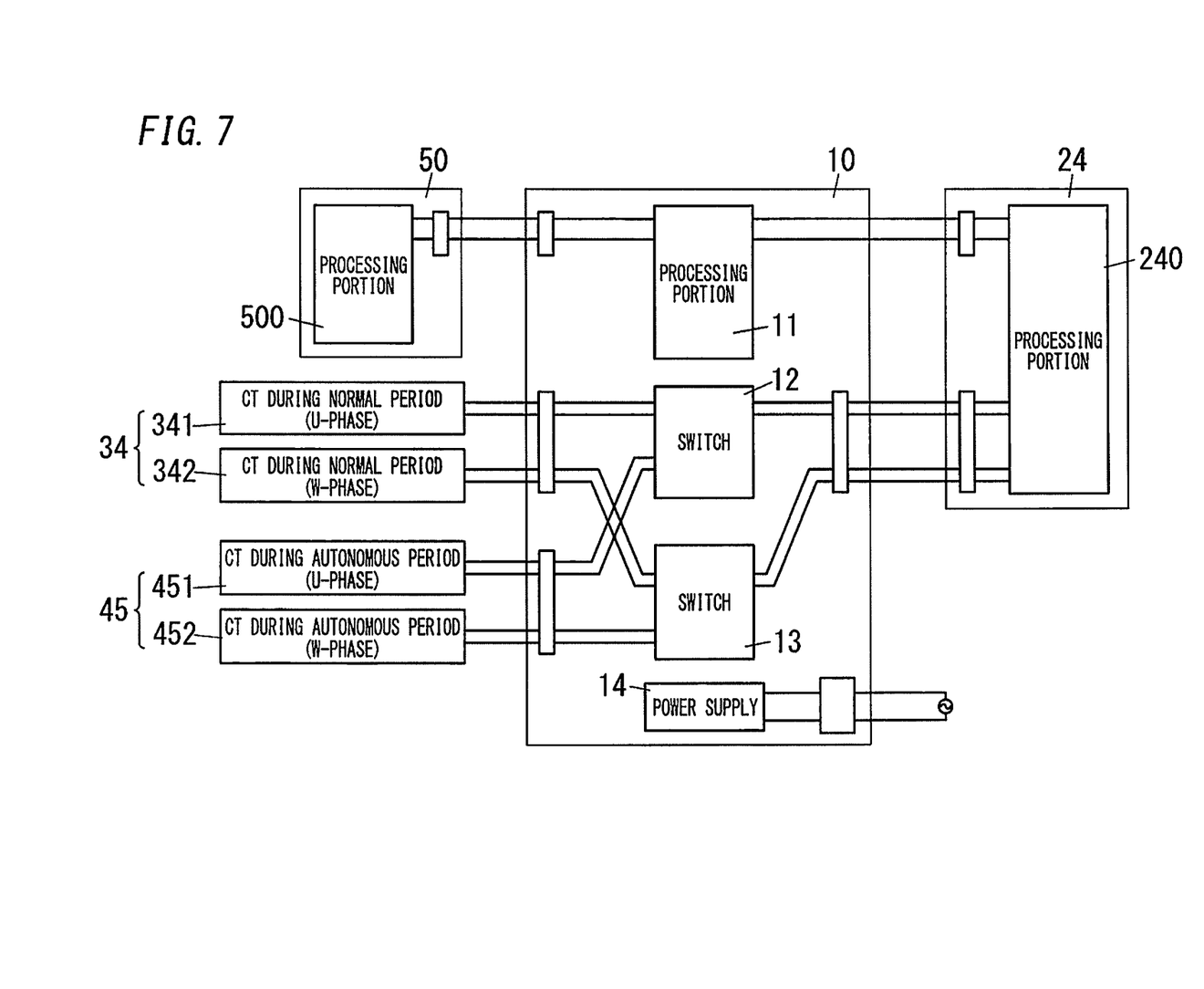
FIG. 7 is a block diagram illustrating a measurement point switching apparatus used for the embodiment.

FIG. 7 shows a schematic configuration of the measurement point switching apparatus 10. In the figure, a component relating to control of the power conversion apparatus 50 is described as a processing portion 500, and a component relating to control of the fuel battery 24 is described as a processing portion 240. The measurement point switching apparatus 10 includes a processing portion 11 configured to determine whether to connect the current sensor 34 or 45 with the fuel battery 24 by communicating with the processing portions 240 and 500. Those processing portions 11, 240 and 500 include, as major hardware components, devices with processors that operate by programs. This type of device may be selected from a microcomputer with a memory, a processor used in combination with another memory, and the like. Note that, it is preferred that the processing portion 11 be insulated from the processing portions 240 and 500 by photocouplers.

As described above, the current sensor 34 includes two current transformers 341 and 342 for measuring the current through the two voltage wires (the U-phase and the W-phase) individually. Similarly, the current sensor 45 includes two current transformers 451 and 452 for measuring the current through the two voltage wires (the U-phase and the W-phase) individually. Accordingly, the measurement point switching apparatus 10 includes therein two switches 12 and 13 to select any two from the current transformers 341, 342, 451 and 452, for the U-phase and W-phase. In other words, the switch 12 is configured to select one from the current transformers 341 and 451, and the switch 13 is configured to select one from the current transformers 342 and 452. The measurement point switching apparatus 10 further includes a power supply 14 for operating the processing portion 11 and the switches 12 and 13.

Figure 8:
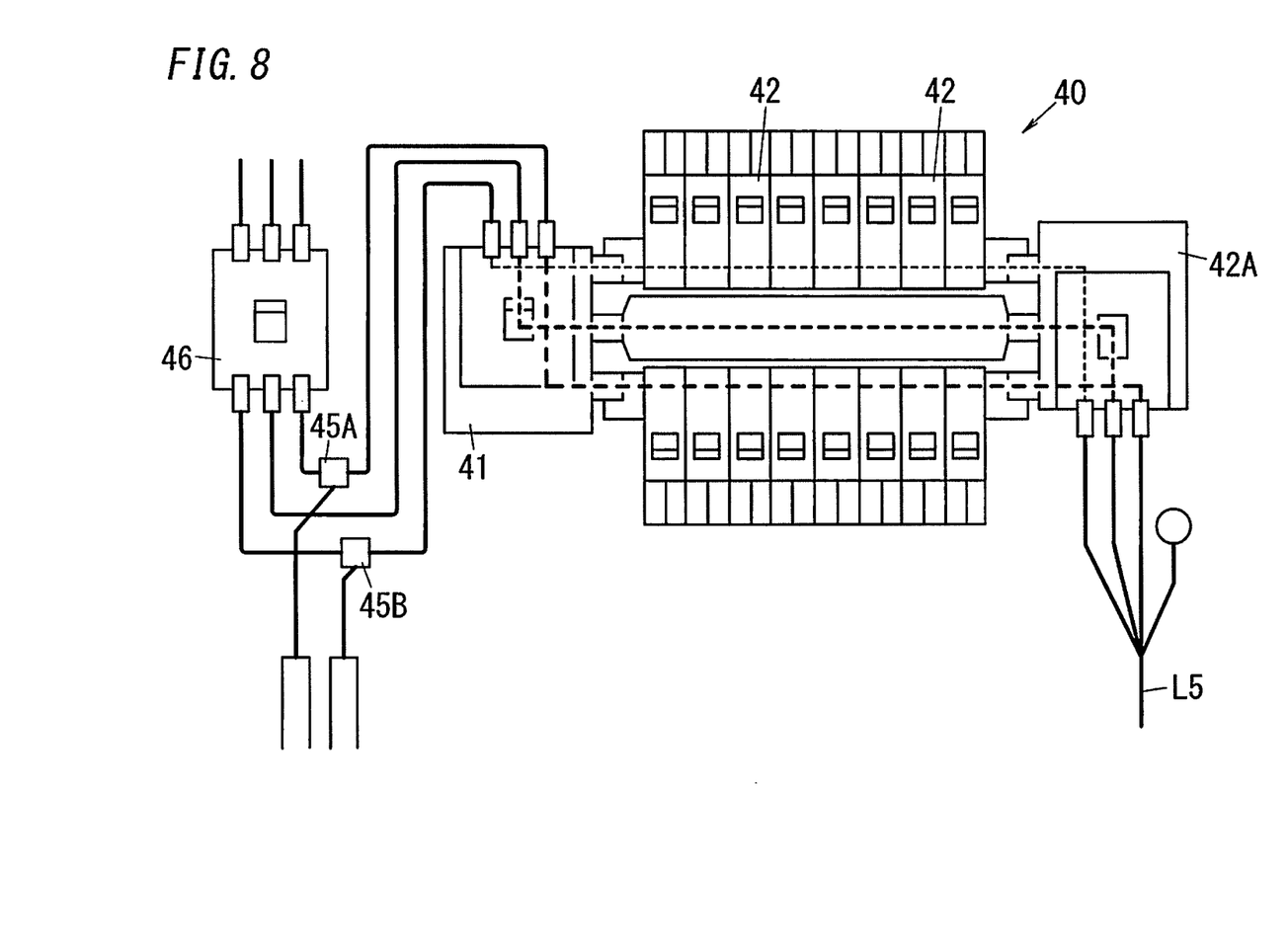
FIG. 8 is a schematic diagram illustrating a configuration example of an autonomous distribution board used for the embodiment.

FIG. 8 shows another configuration example of the autonomous distribution board 40. The illustrated example further includes a branch breaker 42A, which corresponds to a single-phase three-wire type, to be connected with the fuel battery 24 in addition to the usual branch breakers 42 each that corresponds to a single-phase two-wire type. Further, a service breaker 46 for limiting a maximum current is provided on the upstream side of the main breaker 41. The current sensors 45A and 45B connected with the fuel battery 24 during the power failure are disposed to measure currents that flow through electric lines between the service breaker 46 and the main breaker 41. The current sensors 45A and 45B correspond to the current transformers 451 and 452 shown in FIG. 7, and measure the currents of the U-phase and W-phase, individually. Note that, the service breaker 46 is not essential.

According to the configuration described above, the fuel battery 24 is utilized according to the operation mode of the power conversion apparatus 50, using combination of the solar battery 22, the storage battery 23 and the fuel battery 24, and therefore, energy saving is attained. In addition, in the state where the grid power can be received from the grid power source 21, the fuel battery 24 is made to utilize a current value measured by the current sensor 34 provided on the upstream side of the main breaker 31 for receiving the grid power from the grid power source 21, and accordingly, availability of the power generation by the fuel battery 24 is enhanced. Therefore, the shortage of heat quantity for supplying hot water is prevented.

According to simulation, the power generation amount of the fuel battery 24 in the configuration of the embodiment became twice or more as much as that in a case where the fuel battery 24 was driven only when the power shortage occurred. Furthermore, the sum of a gas bill and an electricity bill in a case of purchasing, from a gas company, fuel gas as fuel for the fuel battery 24 became smaller than a total electricity bill in a case of not using the fuel battery 24. Moreover, the cost reduction in this case was twice or more as much as that in a case where the fuel battery 24 was used only when offsetting the power shortage.

In the above-mentioned embodiment, the fuel battery 24 is shown as an example of the cogeneration device, however, an cogeneration device with gas engine may be adopted. The embodiment is one example according to the invention, and the invention is not limited to the embodiment. Even in a case other than the embodiment, numerous modifications and variations can be made in response to designs or the like without departing from the technical ideas according to the invention.

The invention claimed is:

1. A power supply system, comprising:
a distribution board comprising a main breaker that is connected between a grid power source and a first load;
a power conversion apparatus comprising an interconnection terminal and an autonomous terminal,
the interconnection terminal being for supplying electric power to the main breaker for a period during which grid power is supplied from the grid power source, and
the autonomous terminal being for extracting the electric power from the power conversion apparatus for a period during which supplying of the grid power from the grid power source is stopped;
an autonomous distribution board configured to receive feeding of power via the distribution board for the period during which the grid power is supplied from the grid power source, while receiving the electric power via the autonomous terminal of the power conversion apparatus for the period during which supplying of the grid power from the grid power source is stopped,
the autonomous distribution board being connected with a second load;
a cogeneration device connected with the autonomous distribution board, and configured to perform generating of electricity and heating of water,
the electricity generated by the cogeneration device being prohibited to be made reversely flow into the grid power source; and
a measurement point switching apparatus configured to switch between a first current sensor and a second current sensor to set specific electric power to be output by the cogeneration device,
the first current sensor being configured to monitor a current that flows through the main breaker,
the second current sensor being configured to monitor a current that is supplied from the power conversion apparatus to the autonomous distribution board,
the measurement point switching apparatus being configured to select the first current sensor for the period during which the grid power is supplied from the grid power source, and select the second current sensor for the period during which supplying of the grid power from the grid power source is stopped, and
the cogeneration device being configured to adjust an output thereof based on an output of either the first current sensor or the second current sensor selected by the measurement point switching apparatus so that the specific electric power output by the cogeneration device is consumed by the first and second loads.

2. The power supply system according to claim 1, wherein the cogeneration device is a fuel battery.

3. The power supply system according to claim 1, further comprising a power supply selector configured to select one from: a first state where the autonomous distribution board is connected with the distribution board; and a second state where the autonomous distribution board is connected with the autonomous terminal of the power conversion apparatus.

4. The power supply system according to claim 1, wherein: the power conversion apparatus is capable of being connected with a solar battery and a storage battery;
the power conversion apparatus is configured to output, through the interconnection terminal, at least one of power generated by the solar battery and power stored in the storage battery for the period during which the grid power is supplied from the grid power source, while outputting, through the autonomous terminal, the at least one for the period during which supplying of the grid power from the grid power source is stopped; and
the power conversion apparatus is configured to allow the power generated by the solar battery and output through the interconnection terminal to reversely flow into the grid power source.

5. The power supply system according to claim 4, wherein the power conversion apparatus is configured to be capable of selecting any from:
a first operation mode of reversely flowing excess electric power that is consumed by neither the first load nor the second load, of the power generated by the solar battery, and further performing charging of the storage battery in a time zone in which a unit price of the grid power is relatively low, while performing discharging of the storage battery in a time zone in which the unit price of the grid power is relatively high;
a second operation mode of performing charging of the storage battery with the excess electric power of the power generated by the solar battery, while performing discharging of the storage battery for a time period during which the solar battery generates no power; and
a third operation mode of keeping the storage battery in a fully charged state.

6. A power conversion apparatus to be used for the power supply system according to claim 1.

7. A measurement point switching apparatus to be used for the power supply system according to claim 1.

8. The power supply system according to claim 2, further comprising a power supply selector configured to select one from: a first state where the autonomous distribution board is connected with the distribution board; and a second state where the autonomous distribution board is connected with the autonomous terminal of the power conversion apparatus.

9. The power supply system according to claim 2, wherein: the power conversion apparatus is capable of being connected with a solar battery and a storage battery;
the power conversion apparatus is configured to output, through the interconnection terminal, at least one of power generated by the solar battery and power stored in the storage battery for the period during which the grid power is supplied from the grid power source, while outputting, through the autonomous terminal, the at least one for the period during which supplying of the grid power from the grid power source is stopped; and
the power conversion apparatus is configured to allow the power generated by the solar battery and output through the interconnection terminal to reversely flow into the grid power source.

10. The power supply system according to claim 3, wherein: the power conversion apparatus is capable of being connected with a solar battery and a storage battery;
the power conversion apparatus is configured to output, through the interconnection terminal, at least one of power generated by the solar battery and power stored in the storage battery for the period during which the grid power is supplied from the grid power source, while outputting, through the autonomous terminal, the at least one for the period during which supplying of the grid power from the grid power source is stopped; and
the power conversion apparatus is configured to allow the power generated by the solar battery and output through the interconnection terminal to reversely flow into the grid power source.

11. The power supply system according to claim 8, wherein: the power conversion apparatus is capable of being connected with a solar battery and a storage battery;
the power conversion apparatus is configured to output, through the interconnection terminal, at least one of power generated by the solar battery and power stored in the storage battery for the period during which the grid power is supplied from the grid power source, while outputting, through the autonomous terminal, the at least one for the period during which supplying of the grid power from the grid power source is stopped; and
the power conversion apparatus is configured to allow the power generated by the solar battery and output through the interconnection terminal to reversely flow into the grid power source.

* * * * *